L. Moody.
Crank Paddle.

No. 91,760.     Patented Jun. 22, 1869.

Witnesses;
Henry A. French
Frank G. Parker

Inventor;
Loring Moody

LORING MOODY, OF MALDEN, MASSACHUSETTS.

Letters Patent No. 91,760, dated June 22, 1869.

IMPROVEMENT IN PROPELLING-APPARATUS.

The Schedule referred to in these Letters Patent and making part of the same

Be it known that I, LORING MOODY, of Malden, in the county of Middlesex, and State of Massachusetts, have invented a new, useful, and improved Method of Constructing and Operating Paddles for Vessels; and I do hereby declare that the following is a full, clear, and exact description of the construction and operation of the same, reference being had to the annexed drawings, making a part of this specification, in which—

Figure 2:
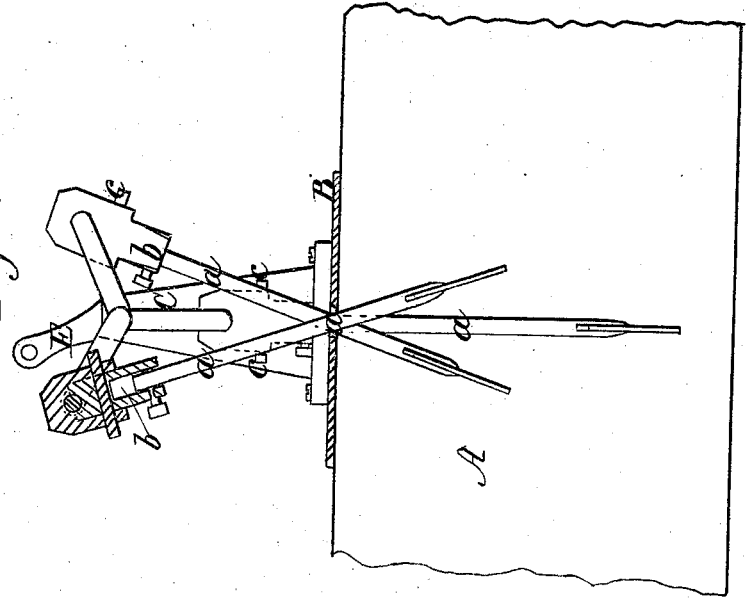
Figure 1:
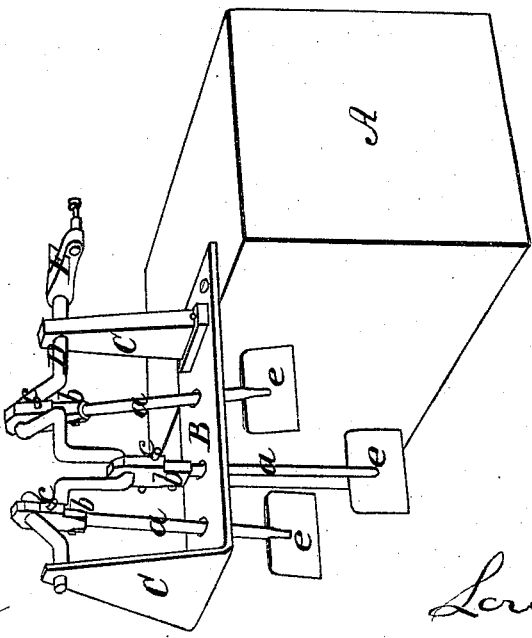

Figure 1 is a perspective view, and
Figure 2, a side elevation.

In the drawings—

A denotes a side-section of a vessel, of any size, from a child's toy to an ocean steamer.

B, the paddle-deck, projecting over the side.

C C, the supports of the crank-shaft.

D, the crank-shaft, with the cranks of which are connected the paddle-shafts, or levers $a\ a\ a$, by means of the sockets $b\ b\ b$, and the coupling-pins $c\ c\ c$, or their equivalents, which shafts or levers pass down through openings in the deck, and to the lower ends of which the paddles $e\ e\ e$ are securely fastened.

On the inner end of the shaft D is fastened the crank E, for the purpose of connecting the shaft with the piston-rod of the engine, or other power.

By means of this arrangement, the paddles are made to dip into the water, move backward, then upward and forward, with each revolution of the crank, and so on.

The paddle-shafts, cranks, and paddles are so proportioned that the paddles may be set much less than their width apart, and yet work clear of each other, the one passing alternately over the other.

By connecting the paddle-shafts with the crank, by means of the sockets and pins, the dip of the paddles in the water may be increased or lessened at pleasure.

The openings in the paddle-deck, through which the paddle-shafts work, should be supplied with friction rollers in large vessels.

What I claim as my invention, and desire to secure by Letters Patent, is—

The described arrangement of paddles, and their levers or shanks, with cranks operating downward through openings in the deck, which serve as fulcra, in the manner set forth.

LORING MOODY.

Witnesses:
HENRY S. FRENCH,
FRANK G. PARKER.